US008942469B2

(12) United States Patent
Moorty et al.

(10) Patent No.: US 8,942,469 B2
(45) Date of Patent: Jan. 27, 2015

(54) METHOD FOR CLASSIFICATION OF VIDEOS

(75) Inventors: Anush Moorty, Madrid (ES); Pere Obrador, Madrid (ES); Nuria Oliver Ramirez, Madrid (ER)

(73) Assignee: Telefonica, S.A., Madrid (ES)

( * ) Notice: Subject to any disclaimer, the term of this patent is extended or adjusted under 35 U.S.C. 154(b) by 199 days.

(21) Appl. No.: 13/807,375

(22) PCT Filed: Jun. 29, 2011

(86) PCT No.: PCT/EP2011/060917
§ 371 (c)(1),
(2), (4) Date: Mar. 1, 2013

(87) PCT Pub. No.: WO2012/001048
PCT Pub. Date: Jan. 5, 2012

(65) Prior Publication Data
US 2013/0156304 A1 Jun. 20, 2013

(30) Foreign Application Priority Data
Jul. 1, 2010 (ES) .................................. 201031019

(51) Int. Cl.
*G06K 9/62* (2006.01)
*G06K 9/00* (2006.01)
*G06K 9/03* (2006.01)

(52) U.S. Cl.
CPC ........ *G06K 9/00536* (2013.01); *G06K 9/00711* (2013.01); *G06K 9/036* (2013.01); *G06K 9/6231* (2013.01)
USPC ........... 382/159; 382/160; 382/219; 382/278; 348/129; 348/135

(58) Field of Classification Search
USPC ........... 382/159, 160, 219, 278; 348/129, 135
See application file for complete search history.

(56) References Cited

U.S. PATENT DOCUMENTS

| 7,840,898 | B2* | 11/2010 | Hua et al. ...................... 715/723 |
| 8,265,333 | B2* | 9/2012 | Lahr et al. ..................... 382/100 |
| 8,564,669 | B2* | 10/2013 | Seigneurbieux .............. 348/180 |
| 8,639,053 | B2* | 1/2014 | Elton et al. .................... 382/264 |

(Continued)

OTHER PUBLICATIONS

Pinson, M.H., et al., "A New Standardized Method for Objectively Measuring Video Quality", IEEE Transactions on Broadcasting, 2004, vol. 50, No. 3, pp. 312-322.

(Continued)

*Primary Examiner* — Yosef Kassa
(74) *Attorney, Agent, or Firm* — Gary J. Gershik; Cooper & Dunham LLP

(57) ABSTRACT

A method for classifying a video regarding a subjective characteristic, the method comprising:
measuring a plurality of basic features (11) per frame thus obtaining a plurality of basic features measurements;
creating a plurality of second-level features by pooling (12) said basic features (11) measurements using a plurality of statistics of said basic features measurements in a determined period of time of footage;
creating a plurality of video features by pooling (13) said plurality of second-level features using a plurality of statistics of said second level features along the duration of the video;
choosing at least one video feature of said plurality of video features for classifying a video regarding a subjective characteristic.

20 Claims, 2 Drawing Sheets

(56) References Cited

U.S. PATENT DOCUMENTS

| | | | |
|---|---|---|---|
| 8,736,535 B2* | 5/2014 | Kimura | 345/98 |
| 8,737,681 B2* | 5/2014 | Lahr et al. | 382/100 |
| 8,773,480 B2* | 7/2014 | Van Ostrand et al. | 345/691 |
| 2005/0234719 A1 | 10/2005 | Hosoda et al. | |
| 2009/0274390 A1 | 11/2009 | Meur et al. | |

OTHER PUBLICATIONS

Rimac-Drlje, S., et al., "Influence of temporal pooling method on the objective video quality evaluation", Broadband Multimedia Systems and Broadcasting, 2009, BMSB 2009, pp. 1-5.

Yiwen Luo and Xiaoou Tang, "Photo and Video Quality Evaluation: Focusing on the Subject", Computer Vision ECCV 2008 [Lecture Notes in Computer Science], 2008, pp. 386-399.

Yen-Fu Ou et al., "Modeling the impact of frame rate on perceptual quality of video", Image Processing, 2008, ICIP 2008, 15th IEEE International Conference, 2008, pp. 689-692.

International Search Report issued on Oct. 21, 2011 by the International Searching Authority in connection with International Application No. PCT/EP2011/060917.

Written Opinion issued on Oct. 21, 2011 by the International Searching Authority in connection with International Application No. PCT/EP2011/060917.

* cited by examiner

METHOD FOR CLASSIFICATION OF VIDEOS

This application is a §371 national stage of PCT International Application No. PCT/EP2011/060917, filed Jun. 29, 2011, the contents of each of which are hereby incorporated by reference into this application.

TECHNICAL FIELD

The present invention relates to the assessment and evaluation of videos. More particularly the present invention relates to the classification of videos based on their technical features.

DESCRIPTION OF THE PRIOR ART

It exists, in today's digital world, the challenge of developing efficient multimedia data management tools that enable users to organize and search multimedia content from growing repositories of digital media. Increasing storage capabilities at low prices combined with pervasive devices to capture digital images and videos enable the generation and archival of unprecedented amounts of personal multimedia content. For example, as of May 2009, about 20 hours of video footage—most of it user-generated—were uploaded on the popular video sharing site YouTube every minute [R. Junee, "20 hours of Video Uploaded Every minute!", http://youtube-global.blogspot.com/, 2009]. In addition, the number of user-generated video creators is expected to grow in the US by 77% from 2008 to 2013 [P. Verna, "A spotlight on UGC Participants", http://www.emarketer.com/Article.aspx?R=1006914 2009].

Text query-based image and video search approaches rely heavily on the similarity between the input textual query and the textual metadata (e.g.: tags, comments, etc.) that have previously been added to the content by users. Relevance is certainly critical to the satisfaction of users with their search results, yet not sufficient. For example, any visitor of YouTube will attest to the fact that most relevant search results today include a large amount of user generated data of varying aesthetic quality (where aesthetics deal with the creation and appreciation of beauty); filtering and re-ranking this data with a measure of its aesthetic value would probably improve the user experience and satisfaction. In addition to improving search results, another challenge faced by video sharing sites is being able to attract advertisement to the user-generated content, particularly given that some of it is deemed to be "unwatchable" [B. Wayne http://www.businessinsider.com/is-youtube-doomed-2009-4, 2009], and advertisers are typically reluctant to place their clients brands next to any material that may damage their clients' reputations [P. Messaris, "Visual Persuasion: the role of images in advertising", Sage Publications Inc. 1997]. The aesthetic analysis of such videos will probably be one of the tools used to automatically identify the material that is "advertisement worthy" vs. not. Besides, video management tools that include models of aesthetic appeal may prove very useful to help users navigate their ever increasing personal video collections.

Note that video aesthetic assessment differs from video quality assessment (VQA) [Wang, Z., Sheikh, H. R. and Bovik, A. C., "Objective video Quality assessment". The Handbook of Video Databases: Design and Applications, 1041-1078, 2003] in that the former seeks to evaluate the holistic appeal of a video and hence encompasses the latter. For example, a low quality video with severe blockiness will have low aesthetic appeal. However, a poorly lit un-distorted video with washed-out colours may have high quality but may also be aesthetically unappealing. Even though image aesthetic assessment has recently received the attention of the research community [Datta, R., Joshi, D., Li, J. and Wang, J. Z., "Studying Aesthetics in photographic images using a computational approach", Vol. 3953, 288, Lec. Notes. in Comp. Sci.—Springer, year 2006], [Ke, Y., Tang, X. and Jing, F., "The design of high-level features for photo quality assessment", IEEE Conf. Comp. Vis. Pat. Recog., 2006], [Luo, Y. and Tang, X., "Photo and Video quality evaluation: Focusing on the subject", Eur. Conf,. Comp. Vis., 386-399, Springer-Verlag Berlin Heidelberg, 2008], [Obrador, P., "Region based image appeal metric for consumer photos", IEEE Work. Mult. Sig. Proc., 696-701, 2008], [Tong, H., Li, M., Zhang, H. J., He, J. and Zhang, C., "Classification of digital photos taken by photographers or home users", Lec. Notes. In Comp. Sci., 198-205, Springer, 2004], video aesthetic assessment remains little explored.

Most of the previous work in the area of visual aesthetic appeal has been done with still images. One of the earliest works in this domain is that by Savakis et al [Savakis, A. E., Etz, S. P. and Loui, A. C., "Evaluation of image appeal in consumer photography", SPIE Proc., Human Vis. Elec. Img, 111-121, 2000] where they performed a large scale study of the possible features that might have an influence on the aesthetic rating of an image. However, the authors did not propose any algorithms to automatically determine the image aesthetic appeal.

In [Tong, H., Li, M., Zhang, H. J., He, J., Zhang, C., "Classification of digital photos taken by photographers or home users", 2004], Tong et al utilized a feature-based approach where many features—including measures of color, energy, texture and shape—were extracted from images and a two-class classifier (high vs. low aesthetic appeal) was proposed and evaluated using a large image database with photos from COREL and Microsoft Office Online (high aesthetic appeal) and from staff at Microsoft Research Asia (low aesthetic appeal). One drawback with this approach is that some of the selected features lacked photographic/perceptual justification.

Furthermore, their dataset assumed that home users are poorer photographers than professionals, which may not always be true.

In an attempt to bridge the gap between data-centric and photographic-centric approaches, Datta et al proposed a computational aesthetics algorithm for images that extracted a large set of features based on photographic rules. Using a dataset from an online image sharing community, the authors extracted the top 15 features in terms of their cross validation performance with respect to the image ratings. The overall feature vector was formed using a filter and wrapper based approach. The authors reported a classification (high vs. low aesthetic appeal accuracy of 70, 12%.

Ke et al utilized a top-down approach, where a small set of features based on photographic rules (e.g. distribution of edges, hue count, blur) were extracted. A dataset obtained by crawling DPChallenge.com was used and the photo's average rating was utilized as ground truth. In their work, Luo and Tang furthered the approach proposed in Ke et al's work by extracting the main subject region (using a sharpness map) in the photograph. A small set of features were tested on the same database as in Ke's contribution, and their approach was shown to perform better than that of Datta et al and Ke et al.

Finally, Obrador recently proposed a region-of-interest based approach to compute image aesthetic appeal where the region-of-interest is extracted using a combination of sharpness, contrast and colorfulness. The size of the region-ofinterest, its isolation from the background and its exposure were then computed to quantify aesthetic appeal with good results on a photo dataset created by the author.

Only the work by Luo and Tang has tackled the challenge of modeling video aesthetics. They applied image aesthetic measures—where each feature was calculated on a subset of the video frames at a rate of 1 frame per second (fps)—coupled with two video-specific features (length of the motion of the main subject region and motion stability). The mean value of each feature across the whole video was utilized as the video representation. Their goal was to automatically distinguish between low quality (amateurish) and high quality (professional) videos. They evaluated their approach on a large database of YouTube videos and achieved good classification performance (approx. 95% accuracy).

SUMMARY OF THE INVENTION

This disclosure represents the first effort to automatically characterize the visual appeal or any other subjective characteristic of videos and classify them according to their technical features. Several low-level features are proposed, calculated on a per-frame basis, that are correlated to subjective characteristics, followed by novel strategies to combine these frame-level features to yield video-level features. Previous work in this area has simply used the mean value of each feature across the video [Luo, Y. and Tang, X., "*Photo and Video quality evaluation: Focusing on the subject*", Eur. Conf,. Comp. Vis., 386-399, Springer-Verlag Berlin Heidelberg, 2008], which fails to capture the peculiarities associated with human perception [Moorthy, A. K. and Bovik, A. C., "*Visual Importance pooling for Image Quality Assessment*", IEEE Jnl. Sel. Top. Sig. Proc., 3:193-201, April, 2009].

In a first aspect, a method for classifying a video regarding a subjective characteristic is disclosed, the method comprising:

measuring a plurality of basic features per frame this obtaining a plurality of basic features measurements;

creating a plurality of second-level features by pooling said basic features measurements using a plurality of statistics of said basic features measurements in a determined period of time of footage;

creating a plurality of video features by pooling said plurality of second-level features using a plurality of statistics of said second level features along the duration of the video;

choosing at least one video feature of said plurality of video features for classifying a video regarding a subjective characteristic.

Preferably, said plurality of basic features measurements comprises at least one of the following features measurements:

at least one of the following motion features measurements: motion ratio and size ratio, wherein said motion ratio is the ratio of motion magnitudes between the foreground and the background regions of the video and said size ratio is the ratio of sizes of said foreground and background regions;

a focus of the region of interest measurement;

a colourfulness measurement;

a luminance measurement;

a colour harmony measurement, wherein said measurement considers the effect that the combination of different colours has on the value of each frame;

a blockiness quality measurement, wherein said blockiness is the consequence of portions of a frame breaking into little squares;

a rule of thirds measurement, wherein said rule of thirds feature accounts for how important compositional elements of the image should be situated.

The motion features are computed as follows:

performing motion estimation, by low-pass filtering the video frame and down-sampling said video frame by a factor of 2;

computing for each pixel location in said frame, the magnitude of the motion vector;

running a k-means algorithm with 2 clusters to segregate the motion vectors into two classes;

histogramming, within each one of said classes, the motion vector magnitudes and choosing the magnitude of the motion vector corresponding to the maximum of the histogram;

motion ratio is computed as f2=(mb+1)/(mf+1), wherein mf and mb denote the magnitude of the motion vectors for each of said classes;

size ratio is computed as f3=(sb+1)/(sf+1), wherein sf and sb denote the size (in pixels) of each of said foreground and background regions respectively.

The focus on the region of interest measurement is computed by extracting said region of interest and setting the median of the level of focus of said region of interest.

The red, green and blue (RGB) values of the frame are used in the following expressions:

$$\alpha = R-B, \beta = 0.5 \times (R+G) - B, m_a = E[a], m_b = E[b], s^{2a} = E[(a-m_a)^2], \text{ and } s^{2b} = E[(b-m_b)^2]$$

wherein, E is the expectation operator, μ is the mean and a the standard deviation, to compute said colourfulness feature measurement as:

$$f_5 = \sqrt{s^{2a} + s^{2b}} + 0.3 \cdot \sqrt{m^{2a} + m^{2b}};$$

The luminance measurement is computed as the mean value of the luminance within a frame.

The colour harmony measurement is computed as follows:

computing the normalized hue-histogram of each frame;

performing a convolution of said hue-histogram with each one of seven harmonic templates over the hue channel in the hue, saturation, value (HSV) space;

selecting the maximum of said convolution as a measure of similarity of the frame's histogram to one of said particular templates;

selecting the maximum value of said measures of similarity as the colour harmony feature value.

The blockiness quality measurement is computed by looking for blockiness artifacts.

The rule of thirds measurement is computed as the minimum distance of the centroid of the region of interest to one of the four intersections of the lines that divide the image into nine equal rectangles.

Preferably, the plurality of statistics of basic features measurements used to create said second-level features comprises at least one of the following: mean, median, minimum, maximum, first quartile and third quartile and the plurality of statistics of second-level features measurements used to create video features comprises average and standard deviation.

Besides, optionally, an additional video feature is created by measuring the actual frame rate of the video, wherein said actual frame rate is computed by using a structural similarity index (SSIM) algorithm as a measure of similarity between frames.

A particular experiment is performed wherein the actual frame rate together with the following video features are selected to characterize a video as high/low appealing, said following video features being referred as statistic of second level feature-statistic of basic feature-basic Feature:
- Mean—third quartile—colourfulness
- Standard Deviation—median—rule of thirds
- Mean—first quartile—focus of the region of interest
- Mean—maximum—luminance
- Mean—first quartile—blockiness quality
- Standard Deviation—median—focus if the region of interest In another aspect, a system comprising means adapted to perform the previously described method is presented.

Finally a computer program is disclosed, comprising computer program code means adapted to perform the method, according to the previous description, when said program is run on a computer, a digital signal processor, a field-programmable gate array, an application-specific integrated circuit, a micro-processor, a micro-controller, or any other form of programmable hardware.

BRIEF DESCRIPTION OF THE DRAWINGS

To complete the description and in order to provide for a better understanding of the invention, a set of drawings and a table are provided. Said drawings form an integral part of the description and illustrate a preferred embodiment of the invention, which should not be interpreted as restricting the scope of the invention, but rather as an example of how the invention can be embodied. The drawings comprise the following figures.

Table 1 shows the best performing 14 features in the performed cross-validation tests.

Corresponding numerals and symbols in the different figures refer to corresponding parts unless otherwise indicated.

DESCRIPTION OF PREFERRED EMBODIMENTS

This disclosure relates to a hierarchical method to characterize videos through different measurable features and automatically classify them as high/low regarding certain subjective characteristics (i.e., content, visual appeal, aesthetic, etc).

In the context of the present disclosure, a microshot is defined as a set of frames amounting to certain duration of video footage. Preferably this duration is approximately 1 second. The method is explained next:

First a plurality of M low-level features measurements (also called basic features measurements) is taken—preferably 8 basic features per frame and 1 basic feature measurement for the entire video—. These M basic features measurements are described in detail later.

Second, more features at higher levels are taken, for which a plurality of pooling strategies at the microshot and video levels, are used. These higher level features are based on a plurality of statistical measures of the values of each of the features across microshots and the entire video. In other words, a two-level pooling is performed, as seen in FIG. 1.

The major difference between an image and a video is the presence of the temporal dimension. In fact, humans do not perceive a series of images in the same fashion as they perceive a video. Hence, the features to be extracted from the videos incorporate information about this temporal dimension. Therefore a hierarchical pooling approach is used to group each of the features extracted on a frame-by-frame basis into a single value for the entire video, wherein pooling is defined as the process of grouping a set of features, either spatially or temporally.

Figure 1:
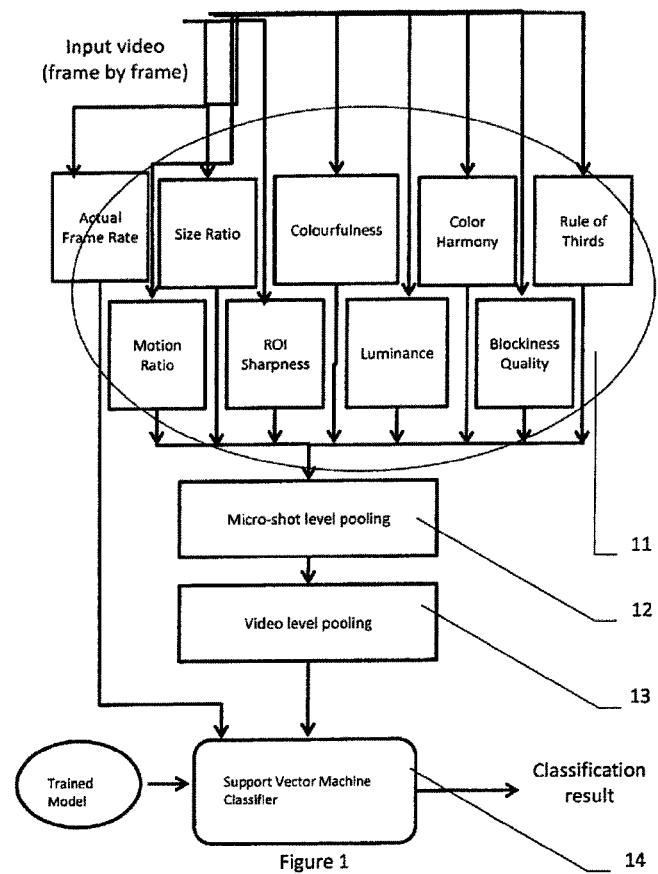
FIG. 1 is a block diagram of the method according to an embodiment of the invention, comprising all steps involved.

As shown in FIG. 1, first, basic features 11 are extracted on a frame-by-frame basis. Next, these basic features (or low-level features) are pooled within each microshot 12, by using a plurality of N different pooling techniques, generating corresponding N microshot-level features for each basic feature. In this disclosure the microshot-level features are also referred to as second-level features.

Preferably, 6 different pooling techniques are used and 6 corresponding microshot-level features are thus generated. Finally, the microshot-level features are pooled across the entire video 13 using two methods (mean and standard deviation), thus generating a set of 2N video-level features for each of the basic features. Since preferably N=6, 12 video-level features are generated for each of the basic features.

Finally, in order to classify the video according to a subjective characteristic at least one of these video-level features is selected.

Next, the M (preferably 9) basic features 11 ($f_1 \ldots f_9$) are explained:

Actual Frame Rate ($f_1$):

By analysing videos it is noticeable that many of them contain repeated frames, which means that the frame-rate extracted from the file header cannot always be relied upon. In order to detect frame repetition, simple inter-frame differences do not perform satisfactorily due to compression mechanisms. Hence, structural similarity index (SSIM) algorithm is used as a measure of similarity between frames.

This algorithm proceeds as follows: A measure of the perceptual similarity of consecutive frames is given by Q=1−SSIM, and is computed between neighbouring frames for all frames of the video to produce a vector m. A low value of Q means that the corresponding frames are perceptually equivalent. To measure periodicity due to frame insertions, the following expression is computed:

$$m^{th} = \{ind(m_i) | m_i <= 0.02\},$$

where the set threshold allows for a small amount of dissimilarity between adjacent frames (due to encoding mechanisms). This signal is differentiated (with a first order filter h[i]=[1 −1]), to obtain dm. If this is a periodic signal it means that frames have been inserted, and the true frame rate is calculated as:

$$f_1 = fps^*(MAX(dm)-1)/T_m,$$

where $T_m$ is the number of samples in m corresponding to the period in dm.

Motion Features (Motion-Ratio ($f_2$), and Size-Ratio ($f_3$)):

The human visual system devotes a significant amount of resources for motion processing. Jerky camera motion, camera shake and fast object motion in video are distracting and they may significantly affect the visual appeal of the video. The approach used stems from the hypothesis that a good video contains two regions: the foreground (main object of interest) and the background. The ratio of motion magnitudes between these two regions and their relative sizes has a direct impact on video subjective perception. Based on this, the motion features are computed as follows:

First a block-based motion estimation algorithm is applied to compute motion vectors between adjacent frames. Since the videos could be compressed, blocking artifacts may hamper the motion estimates. Hence, motion estimation is performed after low-pass filtering and down-sampling (by a factor of 2) each video frame. For each pixel location in a frame, the magnitude of the motion vector is computed. Then, a k-means algorithm with 2 clusters is run in order to segregate the motion vectors into two classes. Within each class, the motion vector magnitudes are histogrammed and the magnitude of the motion vector corresponding to the maximum of the histogram is chosen as a representative vector for that class. Let $m_f$ and $m_b$ denote the magnitude of the motion vectors for each of the classes, where $m_f > m_b$, and let $s_f$ and $s_b$ denote the size (in pixels) of each of the regions respectively. Motion ratio is computed as $$f_2 = (m_b+1)/(m_f+1)$$

and size ratio $$f_3 = (s_b+1)/(s_f+1).$$

The constant 1 is added in order to prevent numerical instabilities in cases where the magnitude of motion or size tends to zero.

Sharpness/Focus of the Region of Interest ($f_4$):

Since the method interest lies in videos, where the cameras are typically focused at optical infinity, measuring regions in focus is challenging. In order to extract the region of interest (ROI), i.e. in-focus region, the algorithm proposed in [Dai, J. Z. and Wu, Y. "Where are focused places of a photo?", Lec. Notes in Comp. Sci., 487, pag 73, Springer, 2007] and the median of the level of focus of the ROI is set as feature $f_4$.

Colourfulness ($f_5$):

Videos which are colourful tend to be seen as more attractive than those in which the colours are "washed out". The colourfulness of a frame is evaluated using the technique proposed in [Hasler, D. and Susstrunk, S. and GmbH, L. and Steinfurt, G., "Measuring Colourfulness in natural images", SPIE/IS\&T Hum. Vis. Elec. Imag., 5007, 87-95, 2003]. The RGB values of the frame are used to compute measures: $\alpha = R-B, \beta = 0.5 \times (R+G)-B, m_a = E[a], m_b = E[b], s^{2a} = E[(a-m_a)^2]$, and $$s^{2b} = E[(b-m_b)^2]$$

where, $E$ is the expectation operator, $\mu$ is the mean and $o$ the standard deviation of the values of interest. Colourfulness is computed as:

$$f_5 = \sqrt{s^{2a}+s^{2b}} + 0.3 \cdot \sqrt{m^{2a}+m^{2b}};$$

This measure has previously been used in [Obrador, P., "Region based image appeal metric for consumer photos", IEEE Work. Mult. Sig. Proc., 696-701, 2008] to quantify the aesthetic appeal of images.

Luminance ($f_6$):

Luminance has been shown to play a role in the visual perception of images [Datta, R., Joshi, D., Li, J. and Wang, J. Z., "Studying aesthetics in photographic images using computational approach", Lec. Notes in Comp. Sci., 3953, 288, Springer, 2006]. Images (and videos) in either end of the luminance scale (i.e., poorly lit or with extremely high luminance) are typically rated as having low appeal value. Hence, the luminance feature $f_6$ is computed as the mean value of the luminance within a frame.

Colour Harmony ($f_7$):

The colourfulness measure does not take into account the effect that the combination of different colours has on the value of each frame. To this effect, colour harmony is evaluated using a variation of the technique by Cohen-Or et al. [Cohen-Or, D., Sorkin, O., Gal, R. Leyvand, T. and Xu, Y. Q., "Color Harmonization", Proc. ACM SIGGRAPH, 25, 624-630, ACM New York, N.Y., USA, 2006] where eight harmonic types or templates over the hue channel in the HSV space are used. Note that one of these templates (N-type) corresponds to grey scale images and hence it is not used here since videos which are object of this procedure are inherently colour videos. The (normalized) hue-histogram of each frame is computed and a convolution of this histogram with each of the 7 templates is performed. The maximum of the convolution is selected as a measure of similarity of the frame's histogram to a particular template. The maximum value of these 7 harmony measures (one for each template) is chosen as the colour harmony feature value.

Blockiness Quality ($f_8$):

The block-based approach used in current video compression algorithms leads to the presence of blockiness in videos. Blockiness is an important aspect of quality and for compressed videos it has been shown to overshadow other subjective aspects. In the present method quality is evaluated by looking for blockiness artefacts as in [Wang, Z, Sheikh, H. R. and Bovik, A. C., "No reference perceptual quality assessment of JPEG compressed images", IEEE Intl. Conf. Image Proc., 1, 477-480, 2002]. Since this algorithm was proposed for JPEG compression, it is defined for 8×8 blocks only. Therefore, the 8×8 block-based quality assessment is used in this feature evaluation.

Rule of Thirds ($f_9$):

This rule states that important compositional elements of the photograph should be situated in one of the four possible "thirds" in an image (i.e., in one of the four intersections of the lines that divide the image into nine equal rectangles, potentially creating a more interesting composition. In order to evaluate a feature corresponding to the rule of thirds, the region of interest (ROI) extracted as described above is utilized. The measure of the rule of thirds $f_9$ is the minimum distance of the centroid of the ROI to these four points.

The goal of the feature extraction process is to generate a collection of features that characterize subjective aspects of an entire video. Therefore, once the 8 frame-level features ($f_2$ to $f_9$) 11 have been computed on every frame, they are combined (or pooled) to generate features at the microshot (i.e., 1 second of video footage) level 12 which are further combined to yield features at the video level 13. Since the best discriminatory power of this diverse set of features may be obtained by different statistical measures depending on the frame-level feature, N different feature pooling techniques for each basic feature are computed, in order to generate the microshot-level features 12. Preferable, N=6:
  mean,
  median,
  min,
  max,
  first quartile (labeled as fourth) and
  third quartile (labeled as three-fourths).

Finally at the video level, the microshot-level features are pooled with two different statistics in order to generate video-level features 13:
  average, computed as the mean of the features across all microshots and
  standard deviation (labeled as std), again computed across all microshots in the video.

Thus, a bag of $((M-1) \times N \times 2)+1$ video-level features are generated for each video. Since preferably M=9 and N=6, there are: 8 frame-level basic features ×6 pooling techniques at the microshot level ×2 pooling techniques at the video level +$f_1$.

In the remainder of this text, the video-level features are referred as videoLevel-microshotLevel-basicFeature. For example, the basic feature Colour harmony ($f_7$), pooled using the median at the microshot level and the mean at the video level is referred as: mean-median-harmony.

The use of these pooling techniques is one of the main contributions of this invention. Previous work [Luo, Y and Tang, X., "Photo and Video quality evaluation: Focusing on the subject", Eur. Conf. Comp. Vis, 386-399, Springer-Verlag Berlin, Heidelberg, 2008] has only considered a down-sampling approach at the microshot level, and an averaging pooling technique at the video level, generating one single video level feature for each basic feature which cannot model their temporal variability.

Next, a particular experiment of the method is detailed, by choosing determined features at the video-level for classifying the videos into high vs. low visual appeal using a support vector machine (SVM) 14 (FIG. 1) [Vapnik, V., "The nature of statistical learning theory", Springer Verlag, 2000] as the classifier.

For this purpose a previous ground truth data collection was performed, summarized in the following steps:

A total of 160 videos—10 videos×16 different queries—were selected for the study.

Figure 2:
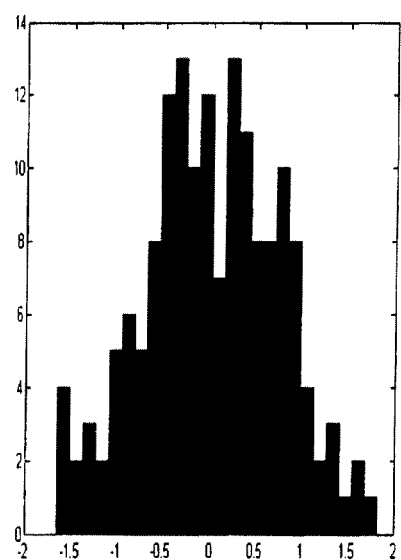
FIG. 2 is the histogram of visual appeal MOS from the user study.

A total of 33 participants (25 male) took part in the study, where participants were asked to rate via a Web interface both the content and the visual appeal of 40 videos (10 videos×4 queries). Each video was embedded into the web interface with two rating scales underneath: one for content and the other for appeal. The scales were: Very Bad (−2), Bad (−1), Fair (0), Good (1), Very Good (2). Thus, a total of 160 videos with ground truth about their visual appeal in the form of mean opinion score (MOS) were obtained. FIG. 2 depicts the histogram of these aesthetic MOS for the 160 videos, where 82 videos were rated below zero, and 78 videos were rated above zero. All scores above the median value are labeled as appealing (80 videos) and those below are labeled as unappealing (80 videos).

In order to classify the videos into these two classes, by using only a few determined features of the method, a support vector machine (SVM) [Vapnik, V., "The nature of statistical learning theory", Springer Verlag, 2000] is used with a radial basis function (RBF) kernel $(C,\gamma)=(1,3.7)$ [Chang, C. and Lin, C. "LIBSVM: a library for support vector machines", http://www.csie.ntu.edu.tw/cjlin/libsvm/, 2001] and the LibSVM package for implementation.

The data is classified with a five-fold cross-validation where 200 train/test runs are carried out with the feature sets that are being tested. This classification is performed on the user study MOS with each of the 97 video-level features. The best performing 14 features in these cross-validation tests are shown in Table 1. The classification performance of these features is fairly stable: the average standard deviation of the classification accuracy across features and over the 200 runs is 2.1211 (min=0.5397, max=3.2779).

But in order to combine the individual features, a hybrid of a filter-based and wrapper-based approach, similar to [Datta, R., Joshi, D., Li, J. and Wang, J. "Studying aesthetics in photographic images using a computational approach", Lec. Notes in Comp. Sci., 3953:288, 2006], is used, only considering the video-level features that individually perform above 50%. First the video-level feature which classifies the data the best is chosen. All the other video-level features derived from the same basic feature and pooled with the same video-level pooling method (i.e., either mean or standard deviation) are discarded from the bag before the next feature is selected. The next selected feature is the one that classifies the data the best in conjunction with the first selected feature, and so on. A 7-dimensional feature vector is thus formed. The feature vector is restricted to 7-dimensions due to relatively small the number of videos in ground truth (160) and in order to prevent overfitting.

The best performance is obtained with the following features (these would be the input to the classifier:
Actual fps
Mean-three-fourth-colorfulness
Std-median-thirds
Mean-fourth-focus
Mean-max-luminance
Mean-fourth-quality
Std-median-focus The selected features in order of their classification performance after being combined with the previously selected features are: actual fps (58.8%, $\sigma=1.5$); mean-three-fourth-colourfulness (67%, $\sigma=1.8$); std-median-thirds (69.5%, $\sigma=1.9$); mean-fourth-focus (69.6%, $\sigma=2.2$); mean-max-luminance (71%, $\Sigma=1.9$); mean-fourth-quality (72.0%, $\sigma=1.9$); and std-median-focus (73.0%, $\sigma=2.0$).

An overall classification accuracy of 73.03% is thus obtained.

The invention claimed is:

1. A method for classifying a video regarding a subjective characteristic which is an aesthetic quality of the video perceived by human, the method comprising:
measuring a plurality of basic features (11) per frame thus obtaining a plurality of basic features measurements;
creating a plurality of second-level features by pooling (12) said basic features (11) measurements using a plurality of statistics of said basic features measurements in a determined period of time of footage;
creating a plurality of video features by temporal pooling (13) said plurality of second-level features using a plurality of statistics of said second level features along the duration of the video;
creating an additional video feature by measuring the frame rate of said video and using a structural similarity index (SSIM) algorithm as a measure of similarity between frames for computing said frame rate;
choosing at least one video feature of said plurality of video features for classifying a video regarding the aesthetic quality, the step of choosing said at least one video feature comprising:
comparing, for a determined combination of video features, an output value from a classifier, which is trained using the determined combination of features, with a training set of values predefined by human input.

2. The method of claim 1, wherein said plurality of basic features (11) measurements comprises at least one of the following features measurements:
at least one of the following motion features measurements: motion ratio and size ratio, wherein said motion ratio is the ratio of motion magnitudes between the foreground and the background regions of the video and said size ratio is the ratio of sizes of said foreground and background regions;
a focus of the region of interest measurement;
a colourfulness measurement;
a luminance measurement;
a colour harmony measurement, wherein said measurement considers the effect that the combination of different colours has on the value of each frame;
a blockiness quality measurement, wherein said blockiness is the consequence of portions of a frame breaking into little squares;

a rule of thirds measurement, wherein said rule of thirds feature accounts for how important compositional elements of the image should be situated.

3. The method of claim 2, wherein said motion features are computed as follows:
performing motion estimation, by low-pass filtering the video frame and down-sampling said video frame by a factor of 2;
computing for each pixel location in said frame, the magnitude of the motion vector;
running a k-means algorithm with 2 clusters to segregate the motion vectors into two classes;
histogramming, within each one of said classes, the motion vector magnitudes and choosing the magnitude of the motion vector corresponding to the maximum of the histogram;
motion ratio is computed as $f_2=(m_b+1)/(m_f+1)$, wherein $m_f$ and $m_b$ denote the magnitude of the motion vectors for each of said classes;
size ratio is computed as $f_3=(s_b+1)/(s_f+1)$, wherein $s_f$ and $s_b$ denote the size (in pixels) of each of said foreground and background regions respectively.

4. The method of 2, wherein said focus on the region of interest measurement is computed by extracting said region of interest and setting the median of the level of focus of said region of interest.

5. The method of claim 2, wherein the red, green and blue (RGB) values of the frame are used in the following expressions:

$$\alpha = R-B, \beta=0.5\times(R+G)-B, m_b=E[b], s^{2a}=E[(a-m_a)^2],$$
$$\text{and } s^{2b}=E[(b-m_b)^2]$$

wherein, E is the expectation operator, μ is the mean and σ the standard deviation, to compute said colourfulness feature measurement as:

$$f_5=\sqrt{s^{2a}+s^{2b}}+0.3\cdot\sqrt{m^{2a}+m^{2b}}.$$

6. The method of claim 2, wherein said luminance measurement is computed as the mean value of the luminance within a frame.

7. The method of claim 2, wherein said colour harmony measurement is computed as follows:
computing the normalized hue-histogram of each frame;
performing a convolution of said hue-histogram with each one of seven harmonic templates over the hue channel in the hue, saturation, value (HSV) space;
selecting the maximum of said convolution as a measure of similarity of the frame's histogram to one of said particular templates;
selecting the maximum value of said measures of similarity as the colour harmony feature value.

8. The method of claim 2, wherein said blockiness quality measurement is computed by looking for blockiness artefacts.

9. The method of claim 2, wherein said rule of thirds measurement is computed as the minimum distance of the centroid of the region of interest to one of the four intersections of the lines that divide the image into nine equal rectangles.

10. The method of claim 1, wherein said plurality of statistics of basic features (11) measurements used to create said second-level features comprises at least one of the following: mean, median, minimum, maximum, first quartile and third quartile.

11. The method of claim 1, wherein said plurality of statistics of second-level features measurements used to create video features comprises average and standard deviation.

12. The method of claim 1, wherein the frame rate together with the following video features are selected to characterize a video as high/low appealing, said following video features being referred as statistic of second level feature-statistic of basic feature-basic Feature:
Mean-third quartile-colourfulness
Standard Deviation-median-rule of thirds
Mean-first quartile-focus of the region of interest
Mean-maximum-luminance
Mean-first quartile-blockiness quality
Standard Deviation-median-focus if the region of interest.

13. A system comprising means adapted to perform the method according to any preceding claim.

14. A non-transitory computer program comprising computer program code means adapted to perform the method according to claim 12 when said program is run on a computer, a digital signal processor, a field-programmable gate array, an application-specific integrated circuit, a micro-processor, a micro-controller, or any other form of programmable hardware.

15. The method of claim 3, wherein said plurality of statistics of basic features (11) measurements used to create said second-level features comprises least one of the following: mean, median, minimum, first quartile and third quartile.

16. The method of claim 15, wherein said plurality of statistics of second-level features measurements used to create video features comprises average and standard deviation.

17. The method of claim 16, wherein the frame rate together with the following video features are selected to characterize a video as high/low appealing, said following video features being referred as statistic of second level feature-statistic of basic feature-basic Feature:
Mean-third quartile-colourfulness
Standard Deviation-median-rule of thirds
Mean-first quartile-focus of the region of interest
Mean-maximum-luminance
Mean-first quartile-blockiness quality
Standard Deviation-median-focus if the region of interest.

18. The method of claim 9, wherein said plurality of statistics of basic features (11) measurements used to create said second-level features comprises at least one of the following: mean, median, minimum, maximum, first quartile and third quartile.

19. The method of claim 18, wherein said plurality of statistics of second-level features measurements used to create video features comprises average and standard deviation.

20. The method of claim 19, wherein the frame rate together with the following video features are selected to characterize a video as high/low appealing, said following video features being referred as statistic of second level feature-statistic of basic feature-basic Feature:
Mean-third quartile-colourfulness
Standard Deviation-median-rule of thirds
Mean-first quartile-focus of the region of interest
Mean-maximum-luminance
Mean-first quartile-blockiness quality
Standard Deviation-median-focus if the region of interest.

* * * * *